United States Patent [19]

Christensen

[11] 4,136,566

[45] Jan. 30, 1979

[54] SEMICONDUCTOR TEMPERATURE SENSOR

[75] Inventor: Douglas A. Christensen, Salt Lake City, Utah

[73] Assignee: University of Utah, Salt Lake City, Utah

[21] Appl. No.: 809,593

[22] Filed: Jun. 24, 1977

[51] Int. Cl.² ............................................. G01K 11/18
[52] U.S. Cl. ..................................... 73/356; 73/362 R; 250/226; 250/227; 356/44
[58] Field of Search ............. 73/356, 362 R, DIG. 11; 356/43, 44; 250/226, 227, 474

[56] References Cited

U.S. PATENT DOCUMENTS

| 2,824,235 | 2/1958 | Hahn, Jr. et al. | 250/474 |
| 3,960,017 | 6/1976 | Romanowski | 73/362 R X |
| 4,016,761 | 4/1977 | Rozell et al. | 73/356 |

*Primary Examiner*—Charles Gorenstein

[57] ABSTRACT

A temperature sensor utilizing a semiconductor sensing element which absorbs monochromatic radiant energy as a function of temperature. The apparatus includes a monochromatic radiant energy source, radiant energy guide means, a semiconductor sensing element interposed in the radiant energy guide means and a detector for detecting the intensity of the monochromatic radiant energy transmitted by the semiconductor sensing element. Advantageously, optical fibers may be used as the radiant energy guide means for directing the monochromatic radiant energy to the semiconductor and returning the transmitted radiant energy to the detector. The semiconductor sensing element is fabricated from a suitable semiconductor material such as galium arsenide. Additionally, the semiconductor material can be fabricated as a mirror or reflecting prism so that it serves both as the sensing element and as part of the optical components for the radiant energy guide means.

8 Claims, 5 Drawing Figures

SEMICONDUCTOR TEMPERATURE SENSOR

This invention was produced under a grant from the United States Government number NIGMS 5RO1 GM23373-02.

BACKGROUND

1. Field of the Invention

This invention relates to temperature sensors and, more particularly, to a temperature sensor including a semiconductor as the sensing element, the semiconductor utilizing the band edge absorption principle of the semiconductor for sensing temperature by absorbing monochromatic radiant energy at a function of the temperature.

2. The Prior Art

Conventional temperature probes utilizing metallic wires and sensors are unusable in the presence of electromagnetic fields because of the inherent electrical interference problems and field perturbation effects. Accordingly, several non-perturbing temperature probes have been fabricated and are either commercially available or described in the literature. For example, fiberoptic temperature probes have been fabricated and have been reported in the literature. Among these are (1) the liquid crystal temperature probe (see "A Prototype Liquid Crystal Fiberoptic Probe for Temperature and Power Measurements in R. F. Fields", Johnson, C. C., et al, *Microwave Journal*, volume 18, number 8, pages 55-59, August 1975); (2) the birefringent crystal optical thermometer (see "A Birefringent Crystal Optical Thermometer for Measurements of Electromagnetically Induced Heating", Cetas, T. C., U.S.N.-C/U.R.S.I" 1975 annual meeting, Boulder, Colorado, Oct. 20-23, 1975); and (3) the Etalon Fiberoptic Probe (see "Temperature Measurement Using Optical Etalons", Christensen, D. A. 1975 Annual Meeting of the Optical Society of America, Houston, Texas, Oct. 15-18, 1974).

The various non-perturbing temperature probes are useful particularly in the measurement of tissue temperature in the presence of an electromagnetic field. This is particularly important where temperature measurements of tissue are performed simultaneously with irradiation by electromagnetic energy. Such tissue treatments include hyperthermia treatment of cancer, microwave biohazards studies and microwave heating, drying, and cooking. To be useful and widely accepted in the trade, it is desirable that the non-perturbing temperature probe be small in diameter at the tip region (less than 0.5 mm), have a stable calibration for at least several weeks, an accuracy of at least 0.2° C. or better, reasonably simple and inexpensive to use and possess a wide temperature range suitable for various tissue treatment procedures (33° C. to about 47° C.), and, additionally, possess a broader temperature range for microwave heating, drying, and cooking.

Each of the foregoing prior art devices are useful. However, it would be an advancement in the art to provide a non-perturbing temperature probe which meets at least some of the previously listed requirements. Such a temperature probe is disclosed and claimed herein.

BRIEF SUMMARY AND OBJECTS OF THE INVENTION

This invention relates to a fiberoptic temperature probe which relies upon the wavelength shift of optical absorption in a semiconductor at its band edge as a function of temperature. Operating at the band edge of the semiconductor, radiant energy of a specified wavelength is propagated through the semiconductor and is absorbed as it excites valence band electrons into the conduction band. Accordingly, the temperature probe technique utilizing a semiconductor sensor is based upon the temperature coefficient which the gap energy displays in the semiconductor sensor material. The semiconductor sensor is obtained from a suitable semiconductor material such as galium arsenide. Advantageously, the semiconductor material is, selectively, fabricated as a reflecting/refracting device as part of the optical components of the system so as to reflect/refract radiant energy through the semiconductor from a monochromatic transmitter to an intensity detector. The intensity of the reflected/refracted radiant energy is measured to provide an indication of the temperature of the semiconductor sensor. As defined herein, monochromatic, quasi-monochromatic, and narrow band radiant energy are terms recognized in the art as representing radiant energy of a relatively narrow and nearly single frequency or wavelength.

It is, therefore, a primary object of this invention to provide improvements in non-perturbing temperature probes.

Another object of this invention is to provide an improved method for sensing temperature particularly in the presence of an electromagnetic field.

Another object of this invention is to provide a semiconductor as the sensor for a temperature probe, the semiconductor being fabricated to form part of the optical system for the temperature probe.

These and other objects and features of the present invention will become more fully apparent from the following description and appended claims taken in conjunction with the accompanying drawing.

DETAILED DESCRIPTION OF THE PREFERRED EMBODIMENTS

Figure 1:
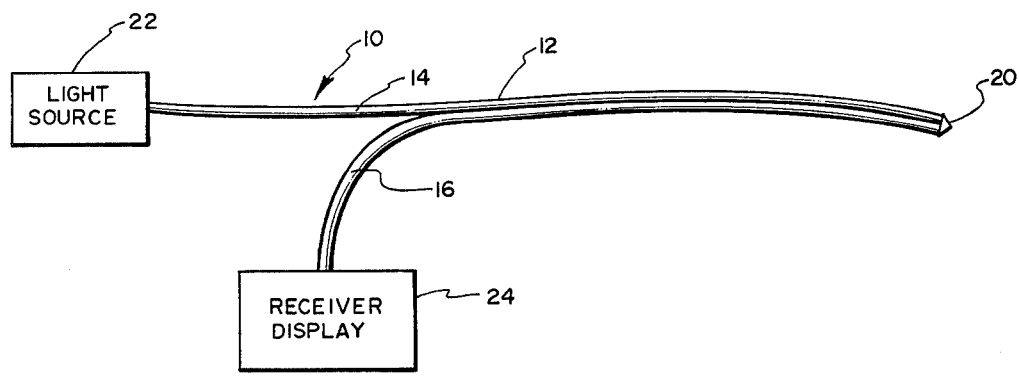
FIG. 1 is a schematic plan view of one presently preferred embodiment of the temperature sensor of this invention.

The invention is best understood by reference to the drawing wherein like parts are designated with like numerals throughout.

General Discussion

Recent work with semiconductor materials has shown that the energy bands for electrons in an intrinsic direct-gap semiconductor are separated by what is referred to in the art as a forbidden zone. The spacing of the forbidden zone for a typical semiconductor material corresponds to a certain infrared or visible radiant energy wavelength. At the temperature ranges of interest herein, KT (Boltzmann's Constant times temperature in degrees Kelvin) is very small compared to the forbidden gap energy (ΔE) so tha the lower band (valence band) electron states are almost completely occupied while the upper band (conduction band) electron states are nearly empty. If radiant energy of a specified wavelength is propagated through the semiconductor, it will be absorbed as it excites valence band electrons into the conduction band. The amount of radiant energy absorbed will be dependent upon the extent that its photon energy (hf) (Plank's Constant times frequency) exceeds the minimum required excitation energy (ΔE). Since the density of electrons states is relatively large, the wavelength range between very little absorption and heavy absorption (the band edge) is extremely narrow.

Accordingly, the present temperature probe technique is based upon the negative temperature coefficient which the gap energy (ΔE) displays in most semiconductor materials. This temperature dependence, coupled with the steep change in absorption as a function of wavelength, leads to a significant temperature-dependent variation in the absorption of any wavelength which lies within the region of rapidly changing radiant energy transmission by the semiconductor material.

The measurement of transient surface temperatures using a semiconductor sensing material and a monochromatic radiation is described in "Novel Method for Measuring Transient Surface Temperatures with High Spatial and Temporal Resolution", *Journal of Applied Physics*, Vol. 43, No. 7, July 1972, page 3213.

Utilizing the foregoing principles, a temperature probe system has been developed in which narrow band radiant energy is obtained from a suitable monochromatic radiant energy source such as a suitable, commercially available monochromator, a light emitting diode (LED) source, or a laser diode. This monochromatic light is transmitted to a small semiconductor sensor located at the tip of the temperature probe. The semiconductor material is suitably shaped and polished so as to provide the necessary optical coupling for the system. The monochromatic light transmitted to the sensor and through the same is reflected to a detector such as a commercially available silicon photodiode. Changes in the sensor temperature are observed as changes in received light intensity by the detector. Accordingly, the light intensity may be related to the temperature of the sensor by a standard calibration curve. Importantly, the sensor material itself is inherently stable. Additionally, the elimination of monochromatic radiant energy source fluctuations involving a conventional reference channel and electronic ratioing before display are believed useful in improving the accuracy of the temperature probe of this invention.

Referring now more particularly to FIG. 1, a schematic illustration of a first preferred embodiment of the semiconductor sensor of this invention is shown generally at 10 and includes a fiberoptic probe 12. Fiberoptic probe 12 includes at least two optical fibers 14 and 16 optically coupled by a semiconductor sensor 20. Semiconductor sensor 20 is fabricated as a prism as will be set forth hereinafter with respect to the description of the invention set forth in FIGS. 2 and 3.

Optical fiber 14 is optically coupled to a monochromatic radiant energy light source 22 and serves as a conducting means for conducting the monochromatic radiant energy from source 22 to the semiconductor sensor 20. Optical fiber 16 is optically coupled between semiconductor 20 and a receiver/display 24 and serves as a conducting means for conducting the temperature-variable radiant energy transmitted by semiconductor sensor 20.

The wavelength of the radiant energy source 22 is specifically chosen so as to be propagated through the semiconductor material and absorbed by semiconductor sensor 20 as a function of temperature. For example, a semiconductor sensor 20 fabricated from a galium arsenide sample 0.25 millimeters thick exhibits a 20% optical transmission at 40° C. and 52.5% optical transmission at 25° C. at a wavelength of 0.899 micrometers. An increase in the wavelength to 0.903 micrometers of the radiant energy directed to the galium arsenide semiconductor sensor resulted in optical transmission values of 45% at 40° C. and 80% at 25° C. Since the temperature range of interest in most tissue experiments is approximately 33° C.–47° C., a wavelength for radiant energy source 22 was chosen as 0.906 micrometers.

In one presently preferred embodiment of this invention, the monochromatic radiant energy was obtained at a wavelength of 0.906 micrometers from a commercially available monochromator. The monochromator was optically coupled to the transmitting optical fiber, optical fiber 14. The intensity of the monochromatic radiant energy transmitted by semiconductor 20 was received in receiver-display 24 where the intensity of the same was detected with a conventional silicon photodiode and digitally displayed. The changes in sensor temperature were observed as changes in received radiant energy intensity which were readily correlated to the temperature by a previously determined calibration curve, for example, as set forth herein at FIG. 5 for galium arsenide.

Figure 2:
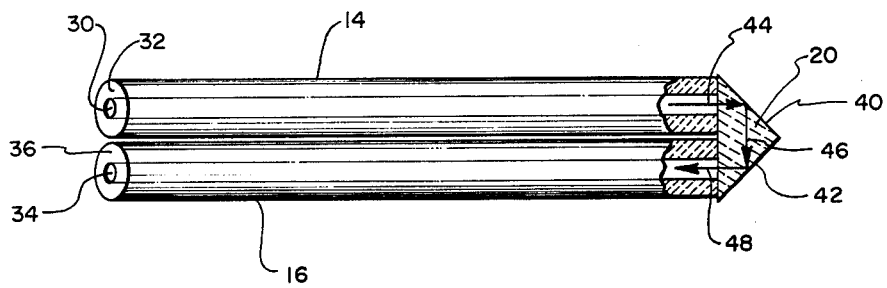
FIG. 2 is a schematic enlargement of the sensor tip region of the temperature probe of FIG. 1.

Referring now more particularly to FIG. 2, the sensing tip of temperature probe 12 is shown schematically and greatly enlarged for ease of illustration. Optical fiber 14 is configurated with a core 30 and a cladding 32. Correspondingly, optical fiber 16 is configurated with a core 34 and a cladding 36.

Figure 3:
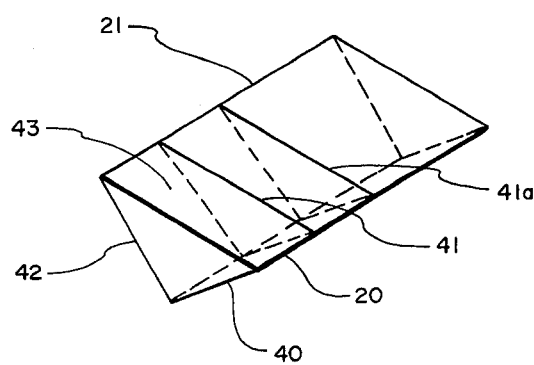
FIG. 3 is an enlarged perspective view of one preferred semiconductor sensor during manufacture.

Semiconductor sensor 20 is fabricated as a prism having reflective faces 40 and 42 and an incident face 43 (FIG. 3). Semiconductor sensor 20 is optically coupled to the ends of optical fibers 14 and 16, and, more particularly, to cores 30 and 34 therein, respectively.

In the embodiment illustrated herein, the monochromatic light emitted by monochromatic source 22 (FIG. 1) is indicated schematically as ray 44 and transverse core 30 of optical fiber 14. Ray 44 strikes face 40 of the prismatic configuration of semiconductor sensor 20 and is reflected as ray 46 to face 42 where it is reflected a second time by face 42 as transmitted ray 48. In its traversal of semiconductor sensor 20, the radiant energy is absorbed by semiconductor sensor 20 as a function of the temperature of semiconductor sensor 20. Accordingly, the intensity of transmitted ray 48 will be diminished as the temperature of semiconductor sensor 20 is increased. The intensity of transmitted ray 48 is then readable as temperature as set forth in the representative calibration curve illustrated in FIG. 5.

Only two optical fibers, optical fiber 14 and optical fiber 16, are shown herein. However, it may be found desirable to include additional optical fibers in probe 12 for the purpose of providing suitable radiant energy guide means for the monochromatic radiant energy. Furthermore, increasing the number of optical fibers from two to four would not substantially alter the effective diameter of probe 12 to an undesirable degree since there would be only a slight increase in the diameter with a doubling of the radiant energy-carrying capacity.

Referring now more particularly to FIG. 3, semiconductor sensor 20 is shown at a stage of fabrication from a larger prism 21 of a suitable semiconductor material such as galium arsenide. In one presently preferred technique of fabrication, a block of suitable semiconductor material is selected and suitably secured in a machine block, for example, by releasably bonding one edge of the semiconductor block in a 45° machined groove. Thereafter, the remainder of the block of semiconductor material is polished away leaving a prism 21. A plurality of semiconductor sensors 20 may be cut from semiconductor prism 21 by cutting the same along a line 41 or line 41a so as to provide the appropriate reflecting surfaces. A cut along line 41 provides a prism suitable for attachment across the ends of two optical fibers whereas a cut along line 41a provides a prism suitable for optically coupling at least four optical fibers in probe 12. In particular, the prism configuration of semiconductor sensor 20 is chosen such that the reflective faces 40 and 42 form an isosceles triangle having a 90° angle at the apex. In this manner, the incoming incident ray 44 (FIG. 2) is reflected as ray 46 (FIG. 2) parallel to face 43 until reflected by face 42 as transmitted ray 48 (FIG. 2) into core 34 of optical fiber 16. Advantageously, faces 40 and 42 of semiconductor sensor 20 do not require a reflective coating in view of the relatively high index of refraction for a material such as galium arsenide. For example, the index of refraction for galium arsenide is approximately 3.4, the index of refraction being dependent upon the wavelength of the incident electromagnetic radiation.

Clearly, semiconductor sensor 20 could be readily configured as a double component system involving a section of semiconductor sensor material in intercepting relationship to incident light 44 (FIG. 2) with a conventional prismatic or other suitable light coupling means for directing the transmitted light 48 into core 34 of optical fiber 16. The relatively high index of refraction of the semiconductor sensor material set forth hereinbefore renders the optical coating of the reflective faces of the prismatic configuration of semiconductor sensor 20 unnecessary. It is, therefore, presently preferred that the semiconductor sensor 20 be configured as a prism as shown herein.

Figure 4:
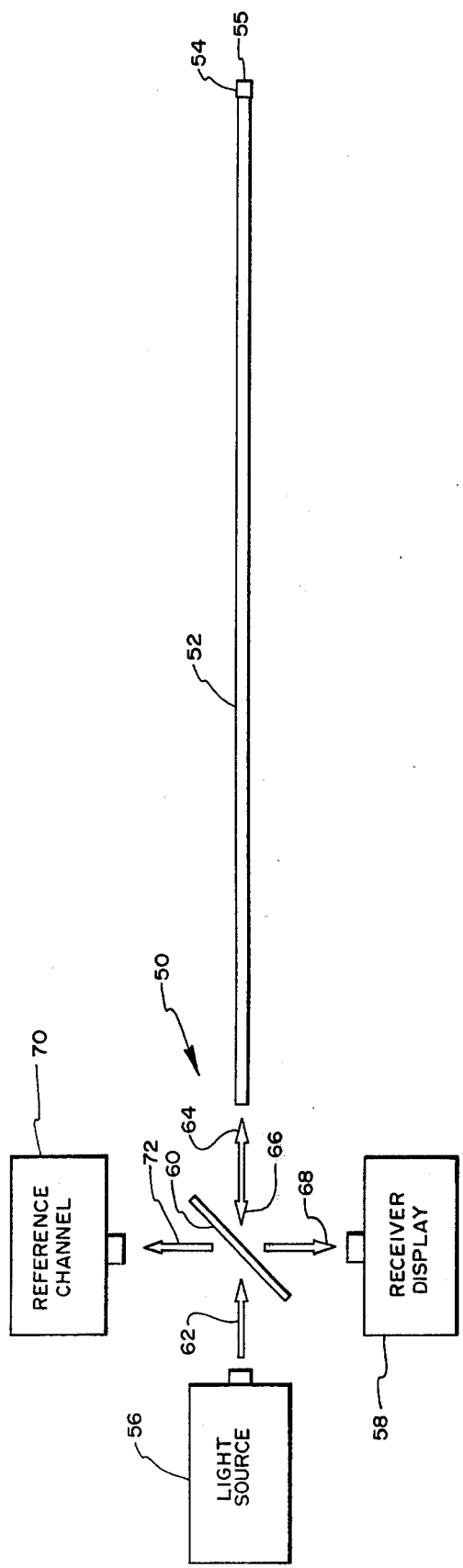
FIG. 4 is a schematic plan view of a second preferred embodiment of the temperature sensor of this invention.

Referring now more particularly to FIG. 4, a second preferred temperature sensor configuration is shown herein generally at 50 and includes a single transmitting/receiving optical path 52 optically coupled to a semiconductor sensor 54. Semiconductor sensor 54 is configured as a flat element having a flat reflective face 55 formed thereon. As illustrated, semiconductor sensor 54 is shown having an exaggerated thickness for ease of presentation. However, it is presently preferred that semiconductor sensor 54 be fabricated as a flat disc and optically coupled at one face to the end of optical path 52. In this manner, semiconductor sensor 54 serves as a temperature sensor and also as part of the optical components for the radiant energy conducting means of this invention. Optical path 52 may be one or a plurality of optical fibers such as optical fibers 14 and 16 (FIGS. 1 and 2). Regardless of the number of optical fibers therein, optical path 52 is configured to both transmit and receive radiant energy for semiconductor sensor 54.

A monochromatic radiant energy indicated schematically at ray 62 is obtained from a conventional monochromatic radiant energy source 56. Ray 62 is directed through a beam splitter 60 where it is optically coupled as incident ray 64 to optical path 52. Incident ray 64 traverses the length of optical path 52 where it enters semiconductor sensor 54 and is reflected by reflective face 55 thereof. Semiconductor sensor 54 absorbs radiant energy of incident ray 64 as a function of temperature as set forth hereinbefore. Face 55 reflects the reduced intensity radiant energy from semiconductor sensor 54 as transmitted ray 66. Transmitted ray 66 strikes the beam splitter 60 and is directed as reflected ray 68 into a conventional receiver/display 58. The intensity of ray 68 is interpreted by receiver/display 58 as the temperature of semiconductor sensor 54.

Experimental results have shown that extraneous radiation reflected and/or refracted by beam splitter 60 will enter receiver/display 58 and give a spurious reading to the signals received therein unless appropriate steps are taken to assure that it is excluded. Additionally, source fluctuations in radiant energy source 56 may result in spurious signals received by receiver/display 58 unless some form of conventional signal filtering or ratioing is used. For example, a reference channel 70 may be optically coupled to beam splitter 60 to receive reflected ray 72 and thereby serve as a means for detecting and cancelling source fluctuations from the readings developed by receiver/display 58. The various components of this system including radiant energy source 22 (FIG. 1), receiver/display 24 (FIG. 1); radiant energy source 56, receiver/display 58, and reference channel 70 are all commercially available equipment that is well known in the art.

Importantly, the semiconductor sensor 20 (FIGS. 1-3) and semiconductor sensor 54 (FIG. 4) of this invention is inherently stable and can be made extremely small to correspond with the diameter of the overall optical fiber radiant energy transmitting means for each respective configuration. For example, a total temperature probe diameter of less than 0.250 millimeters was fabricated and achieved a temperature sensing resolution better than 0.2° C. in a temperature range of 33° C.–47° C.

The Method

The method of this invention is practiced by fabricating a temperature sensor from a suitable semiconductor material such as galium arsenide, indium phosphide, selenium, galium aluminum arsenide, or the like which exhibits the appropriate change in optical transmission as a function of temperature for a given wavelength. The temperature sensor can be fabricated so as to form a part of the optical path or may be merely interposed in the optical path as set forth hereinbefore. Optical coupling of the semiconductor material is advantageously achieved by by utilizing an optical fiber system consisting of either one or a plurality of the same so as to suitably optically couple the semiconductor material to the monochromatic light source and the receiver/display.

The monochromatic radiant energy source may be any suitable commercially available source including, for example, a Light Emitting Diode (LED) as set forth hereinbefore, a grating monochromator, laser diode, or the like. Advantageously, the radiant energy source may be coupled with a reference channel including conventional electronic ratioing so as to cancel any source fluctuations in the intensity of the source.

Figure 5:
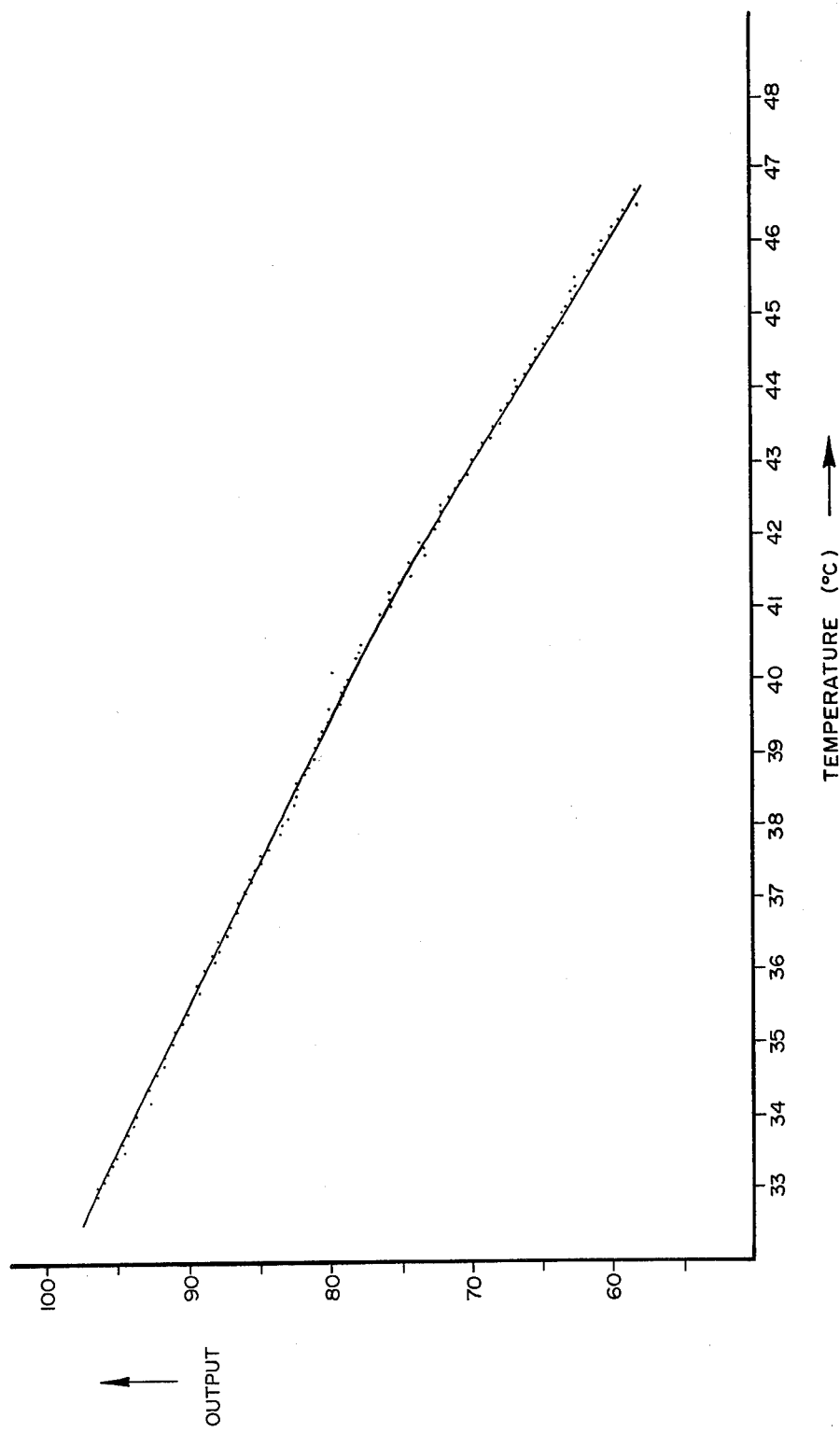
FIG. 5 is graphical comparison between radiant energy transmission and temperature for a galium arsenide semiconductor material.

The detector may be any suitable intensity detector such as a silicon photodiode so as to suitably detect the intensity of the monochromatic radiant energy transmitted by the semiconductor material as a function of temperature. Calibration of the detector is readily attained by placing the semiconductor material in a material of known temperature and preparing a suitable calibration curve, for example, as shown in FIG. 5. Thereafter, the intensity of the transmitted monochromatic radiant energy may be received, interpolated, and digitally displayed as the temperature of the semiconductor material.

In one embodiment of this invention, a temperature probe system was developed whereby a monochromatic radiant energy source having a wavelength of approximately 0.906 micrometers are obtained from a commercially available grating monochromator. This monochromatic radiant energy was transmitted through two optical fibers of a 4-fiber bundle. Each optical fiber had a outer cladding diameter of 0.085 millimeters so that the overall diameter of the bundle was less than 0.250 millimeters.

A semiconductor sensor was fabricated as a prism from galium arsenide semiconductor material. The galium arsenide was polished to match the size of the optical fiber bundle and affixed to the tip of the same.

The radiant energy was transmitted through two optical fibers and transmitted through the semiconductor material and thereafter reflected to a silicon photodiode optically coupled to the remaining two fibers of the optical fiber bundle. The intensity variations of the radiant energy transmitted by the galium arsenide sensor were detected by the silicon photodiode and digitally displayed as the temperature of the galium arsenide sensor.

The invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by a United States Letters Patent is:

1. A temperature sensor comprising in combination:
    a radiant energy path means comprising a first optical fiber waveguide means and a second optical fiber waveguide means;
    sensing means prismatically configured so as to provide a direct reflective path from said first waveguide means, through said sensing means, to said second waveguide means, said sensing means being fabricated from material which absorbs a portion of a monochromatic radiant energy transmitted along said direct reflective path through said sensing means as a function of temperature;
    a monochromatic radiant energy source means optically coupled to said first optical fiber waveguide means, thereby introducing said monochromatic radiant energy into said first optical fiber waveguide means; and
    detecting means optically coupled to said second optical fiber waveguide means for detecting the intensity of the monochromatic radiant energy transmitted along said direct reflective path through said sensing means, the detecting means correlating the intensity of the transmitted monochromatic radiant energy with the temperature of the sensing means.

2. The temperature sensor defined in claim 1 wherein the radiation source is operable to emit radiant energy in the near infrared and infrared region of the electromagnetic spectrum.

3. The temperature sensor defined in claim 1 wherein the detecting means further comprises comparing means for comparing intensity of radiant energy emitted by the radiant energy source with the intensity of the energy reflected through said sensing means.

4. The temperature sensor defined in claim 1 wherein the sensing means comprises a bulk semiconductor sample having the characteristic of absorbing radiant energy at a preselected wavelength near the band edge of the semiconductor as a function of temperature.

5. The temperature sensor defined in claim 1 wherein the sensing means comprises a semiconductor having a temperature coefficient of gap energy.

6. The temperature sensor defined in claim 5 wherein the semiconductor is fabricated from galium arsenide.

7. The temperature sensor defined in claim 1 wherein the sensing means is fabricated as a mirror to further improve reflection of the unabsorbed portion of monochromatic radiant energy.

8. A method for sensing temperature in the presence of an electromagnetic field without disturbing said electromagnetic field, the method comprising:
    fabricating a temperature sensor from a semiconductor material having an optical transmission characteristic for a preselected wavelength as a function of the temperature of the sensor, said sensor being prismatically configurated so as to provide a direct reflective path through said temperature sensor;
    providing a radiation source for said preselected wavelength;
    optically coupling the sensor to the radiation source with a first optical fiber waveguide;
    providing a detector capable of detecting intensity changes in the radiation transmitted along said direct reflective path through the sensor as a function of temperature;
    optically coupling the sensor to the detector with a second optical fiber waveguide; and
    sensing temperature by directing the radiation along a direct reflective path from said first optical fiber waveguide through said temperature sensor to said second optical fiber waveguide, and detecting the intensity of the radiation transmitted by the sensor through said second optical fiber waveguide as a function of temperature.

* * * * *